US012793258B2

(12) United States Patent
Bagwell et al.

(10) Patent No.: US 12,793,258 B2
(45) Date of Patent: Nov. 10, 2026

(54) ASSOCIATION OF BOTTOM-UP KEYPOINTS BASED ON BOUNDING BOX EXTENTS

(71) Applicant: GM Cruise Holdings LLC, San Francisco, CA (US)

(72) Inventors: Carden Bagwell, San Francisco, CA (US); Andres Hasfura, Oakland, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 434 days.

(21) Appl. No.: 18/460,123

(22) Filed: Sep. 1, 2023

(65) Prior Publication Data

US 2025/0078310 A1 Mar. 6, 2025

(51) Int. Cl.
*G06T 7/73* (2017.01)
*G06T 7/60* (2017.01)

(52) U.S. Cl.
CPC .................. *G06T 7/73* (2017.01); *G06T 7/60* (2013.01); *G06T 2207/10028* (2013.01); *G06T 2207/30252* (2013.01)

(58) Field of Classification Search
CPC .... G06T 7/70; G06T 7/73; G06T 7/75; G06T 7/60; G06T 2207/10028; G06T 2207/30252
See application file for complete search history.

(56) References Cited

U.S. PATENT DOCUMENTS

| | | | | |
|---|---|---|---|---|
| 12,100,224 | B1 * | 9/2024 | Goel | G06N 3/0464 |
| 2020/0327343 | A1 * | 10/2020 | Lund | H04W 4/46 |
| 2022/0207897 | A1 * | 6/2022 | Zeng | G01S 17/89 |
| 2022/0284624 | A1 * | 9/2022 | Nimmagadda | G06V 20/10 |
| 2022/0343096 | A1 * | 10/2022 | Bhargava | G06V 10/82 |
| 2022/0358314 | A1 * | 11/2022 | Shen | G06V 10/255 |
| 2023/0087261 | A1 * | 3/2023 | Unnikrishnan | G06T 7/50 382/100 |

* cited by examiner

*Primary Examiner* — Manuel L Barbee
(74) *Attorney, Agent, or Firm* — CANTOR COLBURN LLP

(57) ABSTRACT

Systems and techniques are provided for associating vehicle keypoints with a bounding box. An example method includes receiving, by a machine learning model configured to perform object detection, sensor data from one or more sensors of an autonomous vehicle; identifying, based on the sensor data, at least one vehicle that is located within an environment of the autonomous vehicle; generating a bounding box corresponding to the at least one vehicle, wherein the bounding box includes one or more bounding box extents that are based on a type of the at least one vehicle; identifying, based on the sensor data, a plurality of vehicle keypoints each corresponding to a vehicle feature; and associating, based on at least one bounding box extent of the one or more bounding box extents, one or more vehicle keypoints from the plurality of vehicle keypoints with the bounding box.

20 Claims, 6 Drawing Sheets

ASSOCIATION OF BOTTOM-UP KEYPOINTS BASED ON BOUNDING BOX EXTENTS

BACKGROUND

1. Technical Field

The present disclosure generally relates to autonomous vehicles and, more specifically, to systems and techniques for associating bottom-up keypoint detections with objects and/or bounding boxes based on bounding box extents.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
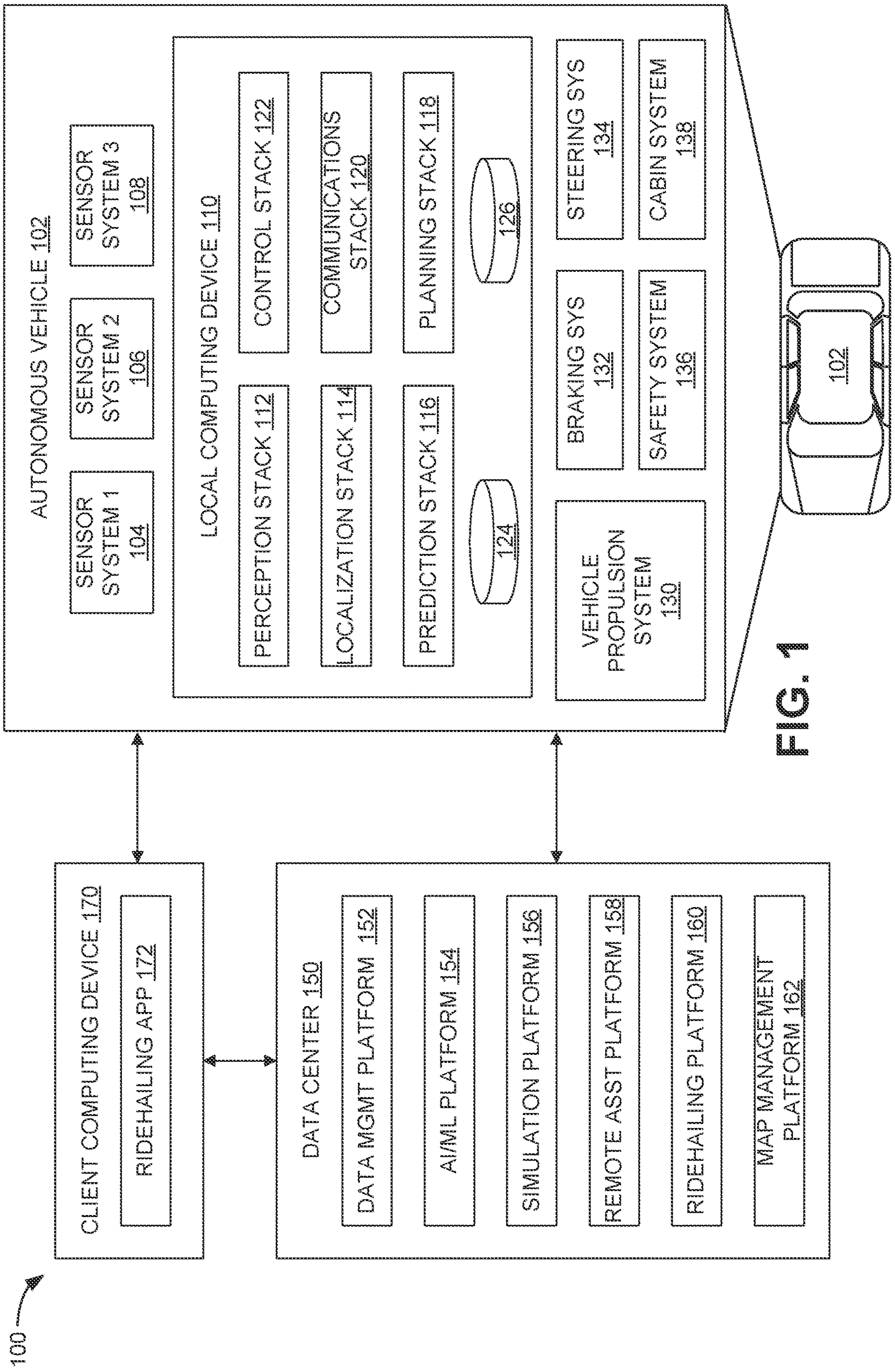
FIG. 1 is a diagram illustrating an example system environment that can be used to facilitate autonomous vehicle (AV) navigation and routing operations, in accordance with some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles (AVs), also known as self-driving cars, driverless vehicles, and robotic vehicles, are vehicles that use sensors to sense the environment and move without human input. For example, AVs can include sensors such as a camera sensor, a LIDAR sensor, and/or a RADAR sensor, amongst others, which the AVs can use to collect data and measurements that are used for various AV operations. The sensors can provide the data and measurements to an internal computing system of the autonomous vehicle, which can use the data and measurements to control mechanical systems of the autonomous vehicle, such as a vehicle propulsion system, a braking system, and/or a steering system, etc.

In some cases, an AV may include a machine learning model that is configured (e.g., trained) to perform object detection based on data from various sensors (e.g., camera sensor data, LiDAR sensor data, RADAR sensor data, etc.). In some examples, the machine learning model may generate a bounding box that can be based on the detection and can be used to track object kinematics. In some aspects, the bounding box may be used to identify keypoints on the object. For example, a bounding box corresponding to a vehicle may be used to identify the corners of the vehicles, which may then be used by downstream models that track and predict movement of the object. However, in some cases, such top-down keypoint detection fails to identify keypoints and/or applies keypoint labels that are not accurate.

Systems and techniques are provided herein for identifying keypoints using a bottom-up approach apart from object detection and associating keypoints with a bounding box. In some examples, keypoints such as the corners of a vehicle can be identified using a separate detection head of a machine learning model. In some cases, the keypoints can then be associated with a bounding box by identifying keypoints that are within a region or area of a bounding box. In some examples, the area or region can be defined using one or more bounding box extents. In some instances, associating keypoints with a bounding box can improve tracking and analysis of object kinematics because it reduces the variability in the dimensions of the bounding box and associates the bounding box with points that are located along an edge of a point cloud.

FIG. 1 is a diagram illustrating an example autonomous vehicle (AV) environment 100, according to some examples of the present disclosure. One of ordinary skill in the art will understand that, for AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a localization stack 114, a prediction stack 116, a planning stack 118, a communications stack 120, a control stack 122, an AV operational database 124, and an HD geospatial database 126, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the perception stack 112 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

Prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

Planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102

(e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

Control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

Communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls layer can include geospatial information of traffic signal lights, traffic signs, and other road objects and related attributes.

AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

Data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ride-hailing service (e.g., a ridesharing service), a delivery service, a remote/roadside assistance service, street services (e.g., street mapping, street patrol, street cleaning, street metering, parking reservation, etc.), and the like.

Data center 150 can send and receive various signals to and from the AV 102 and the client computing device 170. These signals can include sensor data captured by the sensor systems 104-108, roadside assistance requests, software updates, ride-hailing/ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ride-hailing platform 160, and a map management platform 162, among other systems.

Data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ride-hailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ride-hailing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

Simulation platform 156 can enable testing and validation of the algorithms, machine learning models, neural networks, and other development efforts for the AV 102, the remote assistance platform 158, the ride-hailing platform 160, the map management platform 162, and other platforms and systems. Simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

Remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

Ride-hailing platform 160 can interact with a customer of a ride-hailing service via a ride-hailing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ride-hailing application 172. The client computing device 170 can be a customer's mobile computing device or a computing device integrated with the AV 102 (e.g., the local computing device 110). The ride-hailing platform 160 can receive requests to pick up or drop off from the ride-hailing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view; query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ride-hailing platform 160 may incorporate the map viewing services into the ride-hailing application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 6.

Figure 2:
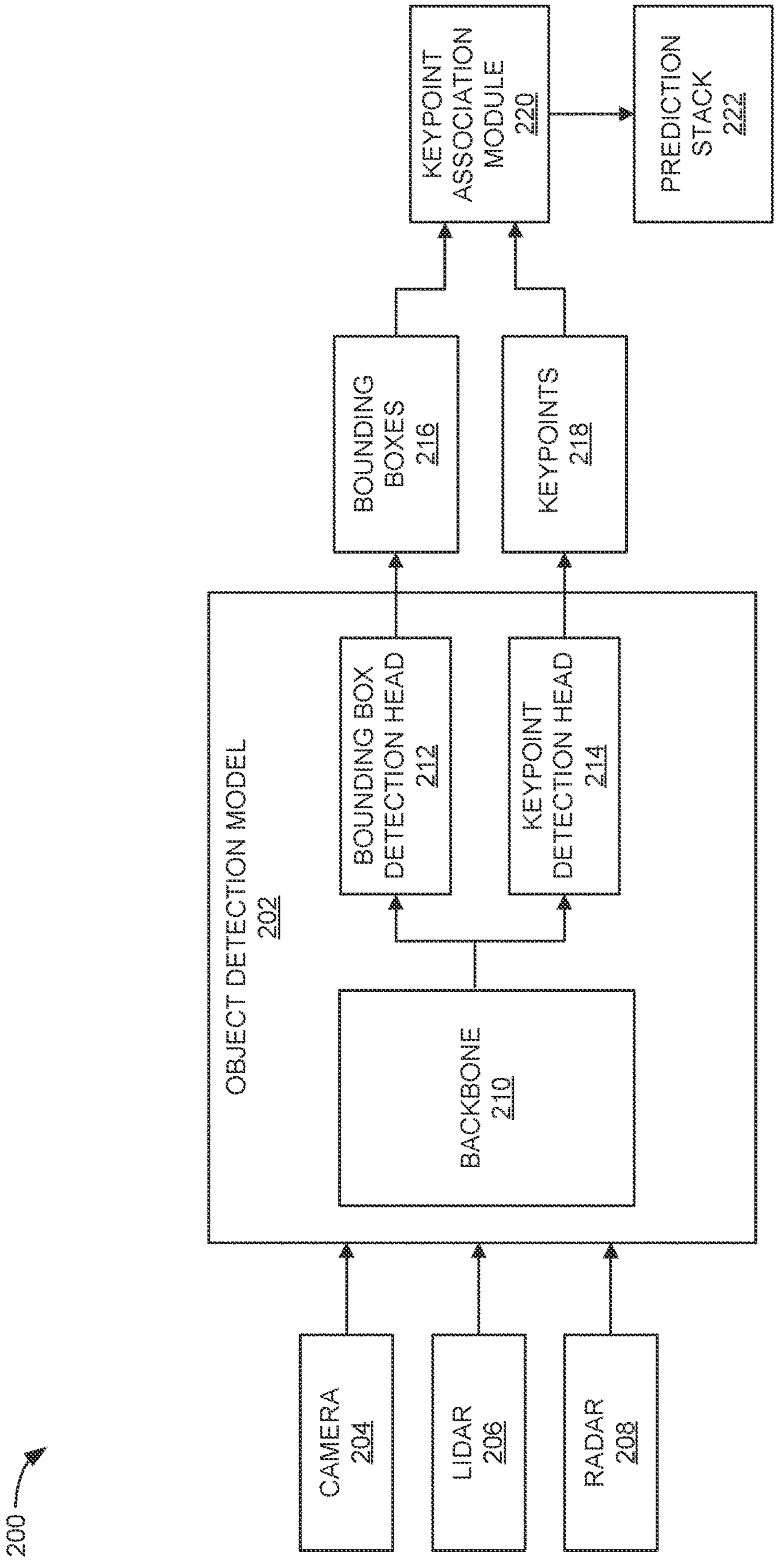
FIG. 2 is a system diagram illustrating an example of a system for performing bottom-up keypoint detection and keypoint association that is based on bounding box extents, in accordance with some examples of the present disclosure.

FIG. 2 is a diagram illustrating an example of a system 200 that can perform bottom-up keypoint detection and keypoint association that is based on bounding box extents. In some aspects, system 200 may be a component of prediction stack 116, as discussed with respect to AV 102. In some configurations, system 200 can include object detection model 202. In some examples, object detection model 202 can be trained to detect and identify objects based on data from one or more sensors. For example, object detection model 202 can be trained to output predictions for object classification as well as bounding boxes that correspond to the detected objects. In another example, object detection model 202 can be trained to detect and identify keypoints that are disassociated from any object predictions (e.g., bottom-up keypoints).

In some aspects, object detection model 202 can receive inputs from one or more sensors (e.g., sensor systems 104-108). For instance, object detection model 202 can receive camera sensor data from camera 204; LiDAR sensor data from LiDAR 206; and/or RADAR sensor data from RADAR 208. In some examples, object detection model 202 can include a backbone 210 that can process sensor data from camera 204, LiDAR 206, and/or RADAR 208. For example, backbone 210 can process sensor data to extract properties and features and to determine information related to position and object structure. In some cases, backbone 210 can perform fusion of sensor data corresponding to different sensor modalities. For example, backbone 210 can fuse (e.g., combine) all or a portion of sensor data received from camera 204, LiDAR 206, and/or RADAR 208.

In some configurations, object detection model 202 can include multiple detection heads that are configured (e.g., trained) to make predictions based on sensor data (e.g., received from camera 204, LiDAR 206, and/or RADAR 208). For example, object detection model 202 can include bounding box detection head 212 that can be trained to determine bounding boxes 216 based on the sensor data. In some aspects, bounding box detection head 212 can determine one or more bounding box extents that are associated with bounding boxes 216. In some cases, the bounding box extents can include one or more dimensions such as height, width, and/or length. In some examples, the bounding box extents can be based on a type of object corresponding to the bounding boxes 216. For instance, bounding box extents can differ for a pedestrian, a bicycle, a motorcycle, a small sedan, a van, a bus, a tractor-trailer, etc.

In some cases, bounding box detection head 212 can determine a confidence score that can be associated with one or more of the bounding box extents corresponding to bounding boxes 216. For example, bounding box detection head 212 can determine a confidence score for the length of the bounding box, the width of the bounding box, the height of the bounding box, and/or any other aspect related to the bounding box. In some instances, the confidence score that is associated with the bounding box extents may be related to a confidence score that is associated with an object detection. In some aspects, the confidence score that is associated with the bounding box extents may be based on the sensor data that is available. For example, an AV may be behind a long vehicle such that the sensors are unable to capture data to accurately measure the vehicle length. In such a case, the corresponding bounding box may have a relatively high confidence score for the width (e.g., based on sensor data that captures the rear dimensions of the vehicle) and a relatively low confidence score for the length (e.g., insufficient sensor data to measure length therefore length is approximated based on prior learning).

In some aspects, object detection model 202 may also include keypoint detection head 214. In some cases, keypoint detection head 214 can identify one or more keypoints 218. In some instances, keypoint detection head 214 can perform bottom-up keypoint detection wherein keypoints 218 are identified irrespective of object detection. That is, keypoint detection head 214 can detect keypoints 218 by identifying features that are associated with the keypoints 218 (e.g., based on sensor data) without identification of a corresponding object.

In some examples, keypoints 218 can include one or more vehicle keypoints or vehicle features. For instance, keypoints 218 can include locations on a vehicle such as the front left corner of the vehicle, the front right corner of the vehicle, the rear left corner of the vehicle, and/or the rear right corner of the vehicle. In another example, keypoints 218 can include the front of a motorcycle and/or the back of a motorcycle. In another example, keypoints 218 can include the location of a hitch that may be associated with an articulated vehicle. In some aspects, the predicted keypoints 218 can correspond to an area that is near an edge of a LiDAR point cloud.

In some aspects, system 200 can include a keypoint association module 220. In some configurations, keypoint association module 220 can determine an association between one or more of the bounding boxes 216 and one or more of the keypoints 218. In one illustrative example, keypoint association module 220 can determine that a keypoint (e.g., from keypoints 218) corresponding to a front left corner of a vehicle is associated with a particular bounding box (e.g., from bounding boxes 216).

In some cases, keypoint association module 220 can identify an area to search for keypoints 218 that may be associated with one of the bounding boxes 216. For example, keypoint association module 220 may use one or more of the bounding box extents to identify a region in which keypoints 218 that are related to the bounding box may be located. In one illustrative example, keypoint association module 220 may search for keypoints 218 that are located within a radial distance of a center of a bounding box. In some aspects, the radial distance can be based on the length of the bounding box. In some cases, the radial distance can be based on the width of the bounding box. In some configurations, the region may be a circular region, an elliptical region, a rectangular region, and/or any regular or irregular shape.

In some aspects, keypoints 218 that are located outside of the search region can be filtered out. That is, keypoint association module 220 can determine that keypoints 218 that are outside of the search region are not associated with the bounding box. In some cases, keypoint association module 220 can consider keypoints 218 that are within the search region for possible association with the bounding box. In some instances, keypoint association module 220 can review a label that is associated with a keypoint (e.g., front right of vehicle) and determine whether it is within a threshold distance of a predicted location of the front right of the vehicle (e.g., based on output of bounding box detection head 212). In some cases, if the keypoint collocated (e.g., within threshold distance) of a corresponding portion of the bounding box, keypoint association module 220 may associate the keypoint with the bounding box.

In some examples, keypoint association module 220 may select a keypoint that is closest to a bounding box based on a predicted offset distance. For instance, bounding box extents may include an expected offset distance for each of the four corners of a vehicle relative to the center of the bounding box. In some configurations, keypoint association module 220 can select the keypoint that is closest to a location corresponding to the expected offset. For example, the search region may include multiple keypoints 218 that are candidates for association with a bounding box (e.g., two vehicles may be parked very close to each other) and keypoint association module 220 can select the keypoint that is closest to a location based on the expected offset distance (e.g., based on bounding box extents).

In some aspects, an association between a keypoint and a bounding box can be used to create an association between the bounding box and a point cloud. That is, the bounding box can be snapped to the point cloud to reduce variability between the point cloud and the bounding box. In some examples, keypoint association module 220 may determine that a keypoint is not available for association with a bounding box. For instance, keypoints 218 may not include any keypoints corresponding to the front left of a vehicle when the sensor data is captured from the opposite side (e.g., rear right of the vehicle).

In some examples, keypoint association data generated by keypoint association module 220 can be provided to one or more downstream machine learning models and/or algorithms that can be used to operate an autonomous vehicle. In some aspects, keypoint association data can be used by the downstream models to improve predictions (e.g., predicted pose, track, orientation, etc.). In some cases, keypoint association data can be used by the downstream model to determine uncertainty and/or confidence parameters. For instance, keypoint association module 220 can send data to prediction stack 222 that can be used to predict kinematics of a tracked object, and prediction stack 222 can use data from keypoint association module 220 to improve tracking of objects. In one example, prediction stack 222 may increase uncertainty parameters associated with a tracked object when the bounding box is missing one or more associated keypoints. In another example, prediction stack 222 may increase confidence parameters associated with predictions when a bounding box is associated with keypoints for all corners of the vehicle.

Figure 3:
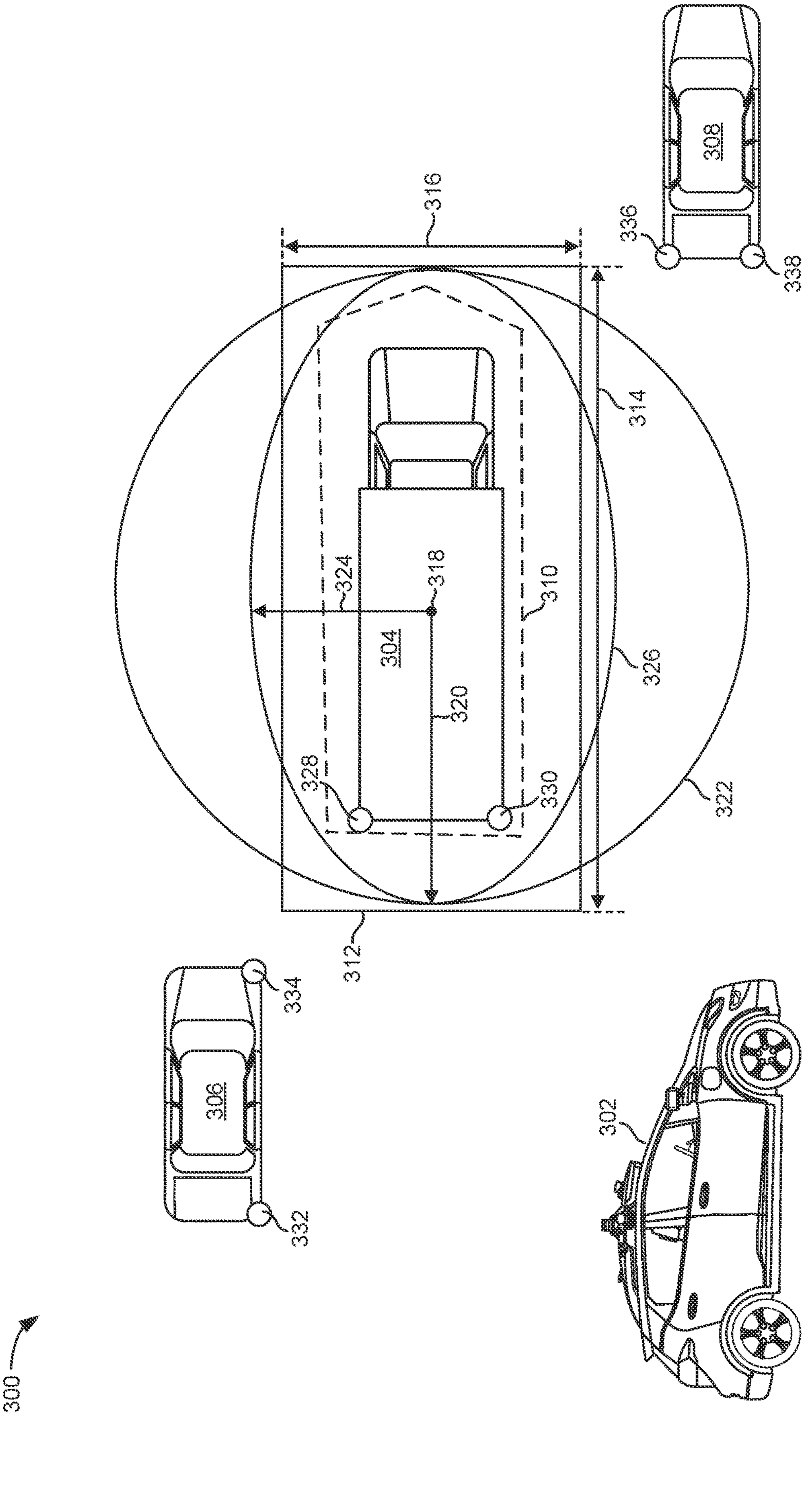
FIG. 3 is a diagram illustrating an example environment that includes keypoint detection and association, in accordance with some examples of the present disclosure.

FIG. 3 is a diagram illustrating an example environment 300 for implementing keypoint detection and association. In some cases, environment 300 may include an autonomous vehicle (AV) 302. In some examples, AV 302 may correspond to AV 102 that includes sensor system 104-108 that are capable of capturing sensor data corresponding to environment 300.

In some examples, AV 302 may implement a system for identifying bounding boxes and keypoints and for associating the bounding boxes with one or more of the keypoints (e.g., system 200). For example, AV 302 may include an object detection model that can identify one or more objects within environment 300. As illustrated, AV 302 may identify truck 304, vehicle 306, and vehicle 308. In some aspects, AV 302 can process sensor data to identify an outline corresponding to the approximate location of an object. For instance, AV 302 can generate outline 310 corresponding to truck 304.

In some aspects, AV 302 may generate a bounding box such as bounding box 312 corresponding to truck 304. In some cases, bounding box 312 can be used to identify, localize, and track the path of truck 304. Although not illustrated, AV 302 may also generate bounding boxes corresponding to vehicle 306 and/or vehicle 308.

In some examples, bounding box 312 can be associated with one or more bounding box extents. For example, bounding box 312 can have a length 314 metric and a width 316 metric as well as a height metric (not illustrated). In some cases, AV 302 may determine the center 318 of bounding box 312.

In some aspects, AV 302 may process sensor data to identify one or more keypoints. In some instances, the keypoints can be determined independent of object recognition using a bottom-up approach. In some configurations, the keypoints can correspond to features or locations of an object. For instance, the keypoints can correspond to the front left corner of a vehicle, the front right corner of a vehicle, the rear left corner of a vehicle, and/or the rear right corner of a vehicle.

As illustrated in FIG. 2, AV 302 has detected keypoint 328 (i.e., rear left corner of truck 304), keypoint 330 (i.e., rear right corner of truck 304), keypoint 332 (i.e., rear right corner of vehicle 306), keypoint 334 (front right corner of vehicle 306), keypoint 336 (i.e., rear left corner of vehicle 308), and keypoint 338 (i.e., rear right corner of vehicle 308). As noted above, each of the keypoints can be detected by AV 302 independent of the detection of a corresponding object. That is, the keypoints detected by AV 302 are not necessarily readily associated with an object.

In some cases, AV 302 can associate one or more keypoints with an object and/or a bounding box. In some examples, association of keypoints with a bounding box can be performed based on one or more bounding box extents. For instance, bounding box extents can be used to identify an area of interest that can be searched for keypoints that may be related to the bounding box. In some aspects, the keypoints that are outside of the area of interest can be filtered out.

In some aspects, the area of interest for identifying keypoints can correspond to a circle 322 having radius 320. In some cases, radius 320 can be based on the length 314 of bounding box 312. In some configurations, the area of interest for identifying keypoints can correspond to an elliptical shape such as ellipse 326 having a radius 324 along the semi-minor axis. In some cases, the radius 324 can be based on the width 316 of bounding box 312. Those skilled in the art will recognize that the area of interest for identifying keypoints can have any shape (e.g., irregular shape) and can be based on one or more of the bounding box extents.

In some examples, AV 302 can determine that keypoint 332, keypoint 334, keypoint 336, and keypoint 338 are outside the area of interest (e.g., circle 322 and/or ellipse 326) and AV 302 can filter out those keypoints as not be related to bounding box 312. In some instances, AV 302 can determine that keypoint 328 and keypoint 330 are inside the area of interest (e.g., circle 322 and/or ellipse 326). Based on their location within the area of interest, AV 302 may associate keypoint 328 and keypoint 330 with bounding box 312 and/or with truck 304.

In some aspects, AV 302 may determine that it was not able to identify keypoints corresponding to the front left corner or the front right corner of truck 304 (e.g., due to limited visibility resulting in sparse sensor data). In some cases, AV 302 can use the presence or absence of keypoints to predict and track the kinematics associated with truck 304. In some examples, keypoint 328 and/or keypoint 330 may be snapped or grouped with bounding box 312 to reduce variance in the size of bounding box 312 while tracking truck 304. In some aspects, snapping bounding box 312 to a keypoint (e.g., keypoint 328 and/or keypoint 330) can create an association with the edge of the LiDAR point cloud (e.g., points used to identify keypoints).

Figure 4:
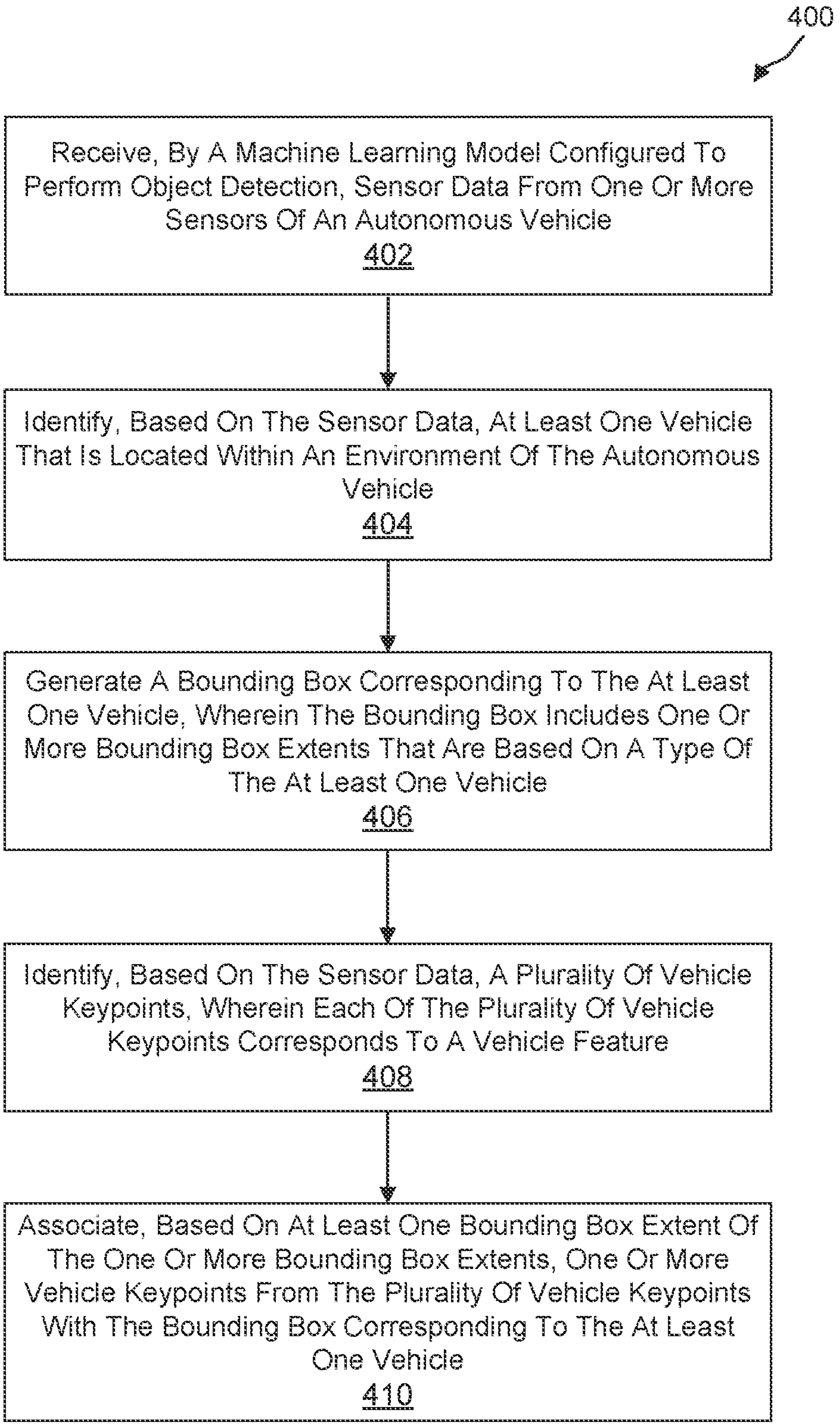
FIG. 4 is a flowchart diagram illustrating an example method for associating keypoints based on bounding box extents, in accordance with some examples of the present disclosure.

FIG. 4 illustrates an example of a process 400 for associating keypoints with a bounding box, according to some aspects of the present disclosure. Although the process 400 depicts a particular sequence of operations, the sequence may be altered without departing from the scope of the present disclosure. For example, some of the operations depicted may be performed in parallel or in a different sequence that does not materially affect the function of process 400. In other examples, different components of an example device or system that implements process 400 may perform functions at substantially the same time or in a specific sequence.

At step 402, the process 400 includes receiving, by a machine learning model configured to perform object detection, sensor data from one or more sensors of an autonomous vehicle. For example, object detection model 202 can receive sensor data from camera 204, LiDAR 206, and/or RADAR 208, which may be associated with autonomous vehicle 302.

At step 404, the process 400 includes identifying, based on the sensor data, at least one vehicle that is located within an environment of the autonomous vehicle. For instance, AV 302 can identify truck 304 within environment 300.

At step 406, the process 400 includes generating a bounding box corresponding to the at least one vehicle, wherein the bounding box includes one or more bounding box extents that are based on a type of the at least one vehicle. For example, AV 302 can generate bounding box 312 corresponding to truck 304, and bounding box 312 can include bounding box extents such as length 314 and/or width 316 which may be based on the type of vehicle (e.g., a truck, sedan, jeep, bus, etc.). In some cases, the bounding box can be generated by a first detection head of the machine learning model and the plurality of vehicle keypoints are identified by a second detection head of the machine learning model. For example, the bounding box can be generated by bounding box detection head 212 and the vehicle keypoints can be identified by keypoint detection head 214.

At step 408, the process 400 includes identifying, based on the sensor data, a plurality of vehicle keypoints, wherein each of the plurality of vehicle keypoints corresponds to a vehicle feature. For example, AV 302 can identify keypoints such as keypoint 328, keypoint 330, keypoint 332, keypoint 334, keypoint 336, and keypoint 338. In some aspects, the vehicle feature can include at least one of a left front corner, a right front corner, a left rear corner, and a right rear corner. In some examples, the one or more vehicle keypoints can each correspond to a plurality of Light Detection and Ranging (LiDAR) points from a LiDAR point cloud that is part of the sensor data, and the one or more vehicle keypoints can be distinct from corresponding corners of the bounding box.

At step 410, the process 400 includes associating, based on at least one bounding box extent of the one or more bounding box extents, one or more vehicle keypoints from the plurality of vehicle keypoints with the bounding box corresponding to the at least one vehicle. For instance, AV 302 can associate keypoint 328 and/or keypoint 330 with bounding box 312 based on their location inside of an area that is defined using one or more bounding box extents.

In some cases, to associate the one or more vehicle keypoints with the bounding box the process 400 can include determining a distance between the bounding box and the plurality of vehicle keypoints. For example, AV 302 may determine a distance between bounding box 312 and keypoint 328 and/or keypoint 330.

In some aspects, the process 400 can include determining a radius having a length that is based on the at least one bounding box extent; and identifying the one or more vehicle keypoints from the plurality of vehicle keypoints based on a location of the one or more vehicle keypoints within an area as defined by the radius from a center of the bounding box. For instance, AV 302 can determine radius 320 and/or radius 324 based on length 314 and/or width 316 and keypoint 328 can be identified based on its location within circle 322 and/or ellipse 326.

In some cases, the process 400 can include discarding a portion of the plurality of vehicle keypoints that is outside the area as defined by the radius from the center of the bounding box. For example, keypoint 332, keypoint 334, keypoint 336, and/or keypoint 338 can be discarded (e.g., filtered) because they are located outside of circle 322.

In some aspects, the process 400 can include determining a confidence score corresponding to the at least one bounding box extent and adjusting a search area for identifying the one or more vehicle keypoints based on the confidence score. For example, AV 302 can determine a confidence score that is associated with length 314 and/or width 316. In some aspects, AV 302 can adjust the size or shape of the search area for identifying keypoints (e.g., circle 322 and/or ellipse 326) based on the confidence score. For example, length 314 may be associated with a relatively low confidence score because truck 304 is long and self-occluding. In some cases, AV 302 may adjust (e.g., increase or decrease) radius 320 that is based on length 314 if the confidence score is beneath a threshold level.

In some cases, the process 400 can include determining that at least one vehicle keypoint corresponding to at least one corner of the at least one vehicle is not available; and providing an indication of the at least one vehicle keypoint that is not available to a prediction stack of the autonomous vehicle, wherein the prediction stack is configured to predict a path for the at least one vehicle. For example, keypoint association module 220 may determine that keypoints corresponding to the front of truck 304 are not available and keypoint association module 220 can provide an indication of same to prediction stack 222.

Figure 5:
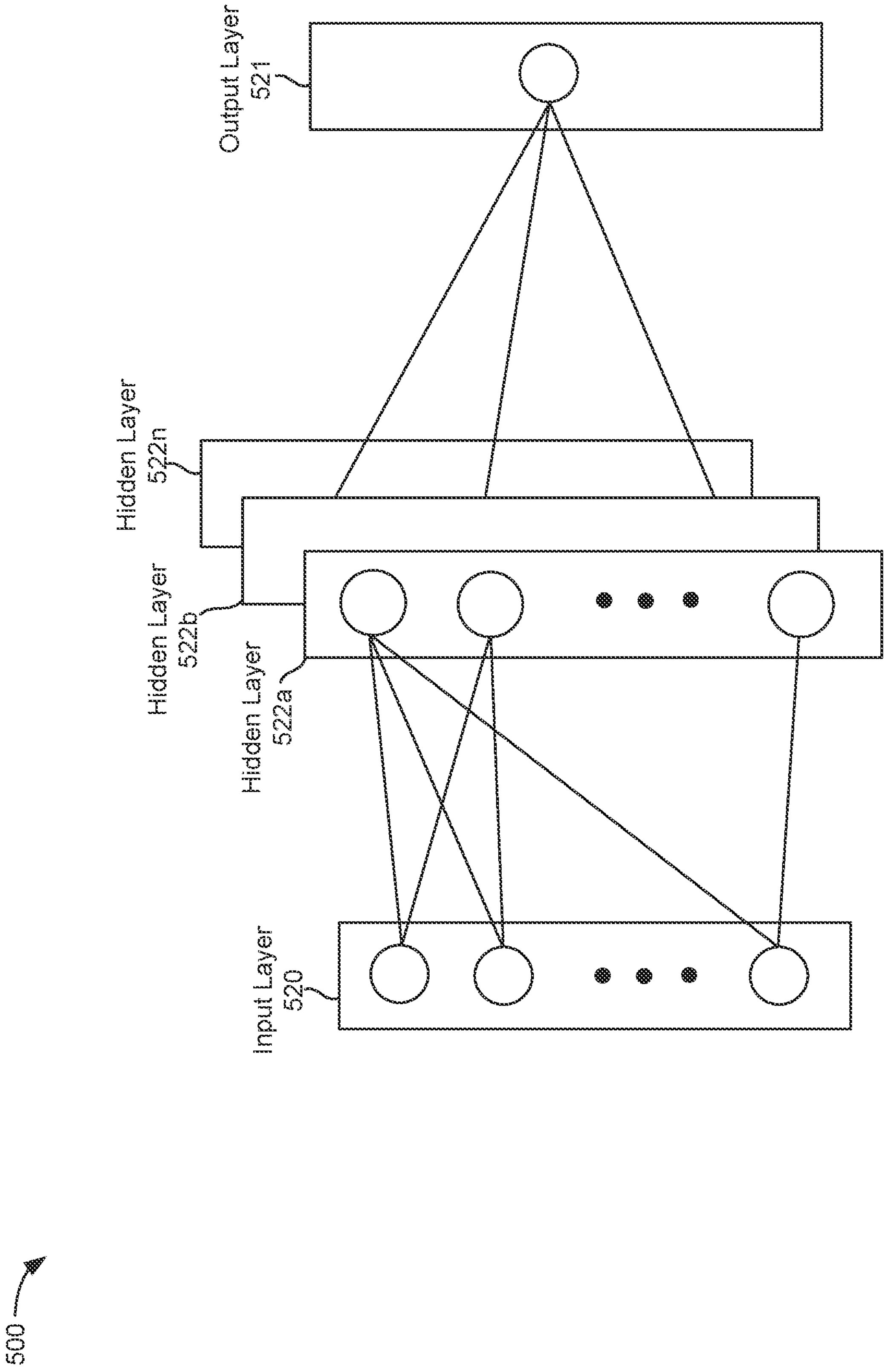
FIG. 5 illustrates an example of a deep learning neural network that can be used to implement aspects of the present technology, in accordance with some examples of the present disclosure.

In FIG. 5, the disclosure now turns to a further discussion of models that can be used to implement the systems and techniques described herein. FIG. 5 is an example of a deep learning neural network 500 that can be used to implement all or a portion of the systems and techniques described herein (e.g., neural network 500 can be used to implement a perception module (or perception system) as discussed above). An input layer 520 can be configured to receive sensor data (e.g., camera data, LiDAR data, radar data, etc.) and/or data relating to an environment surrounding an AV. The neural network 500 includes multiple hidden layers 522*a*, 522*b*, through 522*n*. The hidden layers 522*a*, 522*b*, through 522*n* include "n" number of hidden layers, where "n" is an integer greater than or equal to one. The number of hidden layers can be made to include as many layers as needed for the given application. In some aspects, the hidden layers 522*a*, 522*b*, through 522*n* can include a backbone that can be configured to process sensor data. For example, hidden layers 522*a*, 522*b*, through 522*n* can be configured to fuse data from different sensors that corresponds to the same field of view (e.g., camera data and LiDAR data corresponding to a same geographic area can be fused).

In some aspects, the neural network 500 further includes an output layer 521 that provides an output resulting from the processing performed by the hidden layers 522*a*, 522*b*, through 522*n*. In one illustrative example, the output layer 521 can include multiple detection heads that can make a prediction (e.g., perform object classification, identify bounding boxes, calculate a confidence score, etc.) that is based on the sensor data. In some cases, a first detection head in output layer 521 can be configured to identify keypoints (e.g., points of interest on an object such as a vehicle). In some examples, a second detection head in output layer 521 can be configured to generate bounding boxes corresponding to detected objects.

The neural network 500 is a multi-layer neural network of interconnected nodes. Each node can represent a piece of information. Information associated with the nodes is shared among the different layers and each layer retains information as information is processed. In some cases, the neural network 500 can include a feed-forward network, in which case there are no feedback connections where outputs of the network are fed back into itself. In some cases, the neural network 500 can include a recurrent neural network, which can have loops that allow information to be carried across nodes while reading in input.

Information can be exchanged between nodes through node-to-node interconnections between the various layers. Nodes of the input layer 520 can activate a set of nodes in the first hidden layer 522*a*. For example, as shown, each of the input nodes of the input layer 520 is connected to each of the nodes of the first hidden layer 522*a*. The nodes of the first hidden layer 522*a* can transform the information of each input node by applying activation functions to the input node information. The information derived from the transformation can then be passed to and can activate the nodes of the next hidden layer 522*b*, which can perform their own designated functions. Example functions include convolutional, up-sampling, data transformation, and/or any other suitable functions. The output of the hidden layer 522*b* can then activate nodes of the next hidden layer, and so on. The output of the last hidden layer 522*n* can activate one or more nodes of the output layer 521, at which an output (e.g., prediction) is provided. In some cases, while nodes in the neural network 500 are shown as having multiple output lines, a node can have a single output and all lines shown as being output from a node represent the same output value.

In some cases, each node or interconnection between nodes can have a weight that is a set of parameters derived from the training of the neural network 500. Once the neural network 500 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 500 to be adaptive to inputs and able to learn as more and more data is processed.

The neural network 500 is pre-trained to process the features from the data in the input layer 520 using the different hidden layers 522*a*, 522*b*, through 522*n* in order to provide the output through the output layer 521.

In some cases, the neural network 500 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 500 is trained well enough so that the weights of the layers are accurately tuned.

In some aspects, the neural network 500 can be trained using different sets of training data. For example, a first set of training data may include sensor data corresponding to a camera sensor that can be used to train the detection head that makes predictions based on camera sensor data. In another example, a second set of training data may include sensor data corresponding to a LiDAR sensor that can be used to train the detection head that makes predictions based on LiDAR sensor data. In another example, a third set of training data may include camera sensor data and LiDAR sensor data that can be used to train the detection head that makes predictions based on camera-LiDAR sensor fusion (e.g., camera and LiDAR data can be fused by a camera-LiDAR fusion backbone.

To perform training, a loss function can be used to analyze error in the output. Any suitable loss function definition can be used, such as a Cross-Entropy loss. Another example of a loss function includes the mean squared error (MSE), defined as $E\_total=\Sigma(\frac{1}{2}\ (target-output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 500 can perform a backward pass by determining which inputs (weights) most contributed to the loss of the network, and can adjust the weights so that the loss decreases and is eventually minimized.

The neural network 500 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 500 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 6:
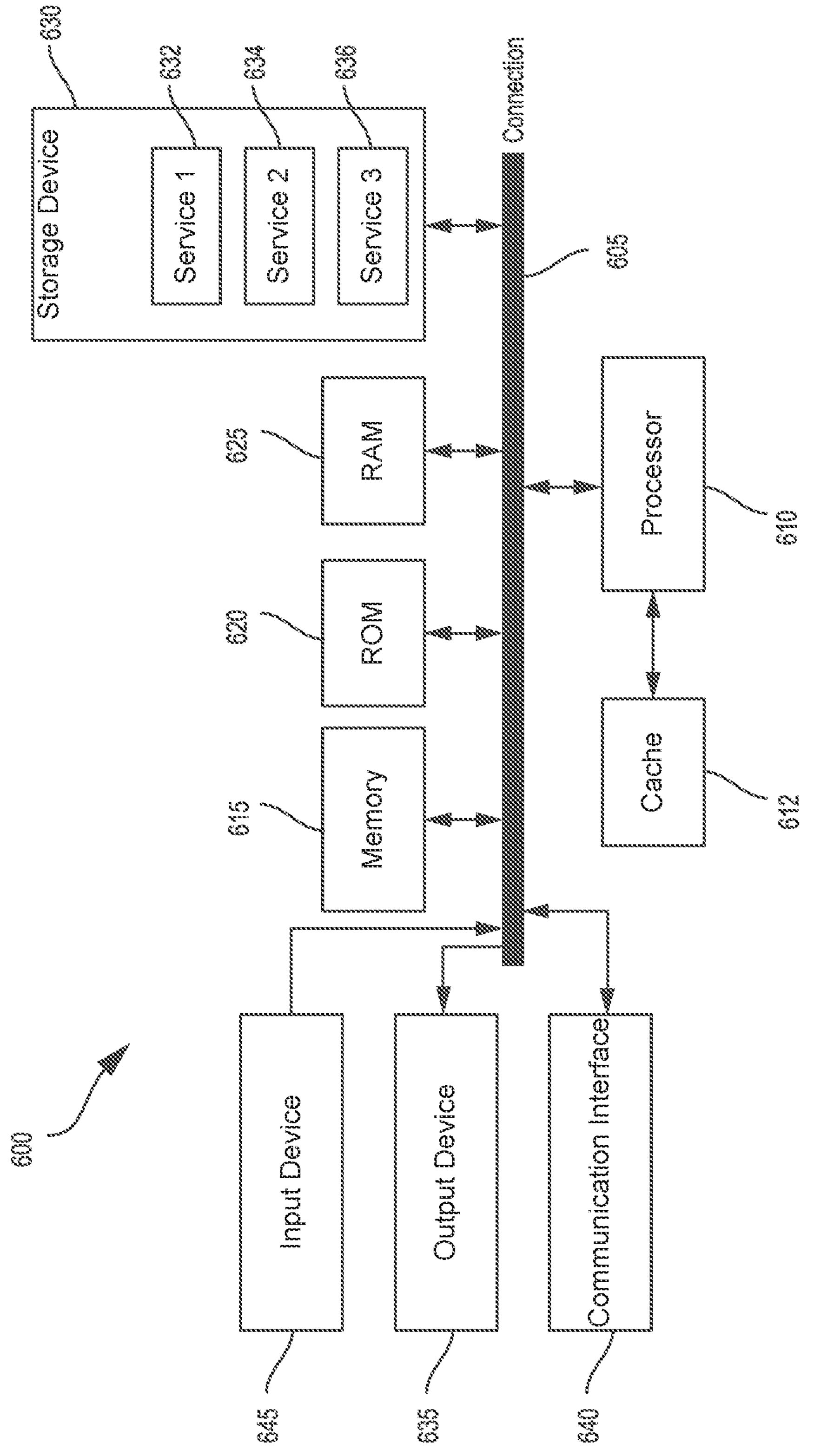
FIG. 6 is a diagram illustrating an example system architecture for implementing certain aspects described herein, in accordance with some examples of the present disclosure.

FIG. 6 illustrates an example processor-based system with which some aspects of the subject technology can be implemented. For example, processor-based system 600 can be any computing device making up local computing device 110, a passenger device executing the ride-hailing application 172, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some examples, computing system 600 is a distributed system in which the functions described in this disclosure can be distributed within a datacenter, multiple data centers, a peer network, etc. In some cases, one or more of the described system components represents many such components each performing some or all of the function for which the component is described. In some aspects, the components can be physical or virtual devices.

Example system 600 includes at least one processing unit (CPU or processor) 610 and connection 605 that couples various system components including system memory 615, such as read-only memory (ROM) 620 and random-access memory (RAM) 625 to processor 610. Computing system 600 can include a cache of high-speed memory 612 connected directly with, in close proximity to, and/or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 can include an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an AppleR; Lightning R port/plug, an Ethernet port/plug, a fiber optic port/plug, a proprietary wired port/plug, a BLUETOOTH®; wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 640) may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L#), resistive random-access memory (RRAM/ReRAM), phase change memory (PCM), spin transfer torque RAM (STT-RAM), another memory chip or cartridge, and/or a combination thereof.

Storage device 630 can include software services, servers, services, etc., that when the code that defines such software is executed by the processor 610, causes the system to perform a function. In some examples, a hardware service that performs a particular function can include the software component stored in a computer-readable medium in connection with the necessary hardware components, such as processor 610, connection 605, output device 635, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the examples and applications illustrated and described herein, and without departing from the scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A method comprising: receiving, by a machine learning model configured to perform object detection, sensor data from one or more sensors of an autonomous vehicle; identifying, based on the sensor data, at least one vehicle that is located within an environment of the autonomous vehicle; generating a bounding box corresponding to the at least one vehicle, wherein the bounding box includes one or more bounding box extents that are based on a type of the at least one vehicle; identifying, based on the sensor data, a plurality of vehicle keypoints, wherein each of the plurality of vehicle keypoints corresponds to a vehicle feature; and associating, based on at least one bounding box extent of the one or more bounding box extents, one or more vehicle keypoints from the plurality of vehicle keypoints with the bounding box corresponding to the at least one vehicle.

Aspect 2. The method of Aspect 1, wherein the vehicle feature includes at least one of a left front corner, a right front corner, a left rear corner, and a right rear corner.

Aspect 3. The method of any of Aspects 1 to 2, wherein the bounding box is generated by a first detection head of the machine learning model and the plurality of vehicle keypoints are identified by a second detection head of the machine learning model.

Aspect 4. The method of any of Aspects 1 to 3, further comprising: determining a radius having a length that is based on the at least one bounding box extent; and identifying the one or more vehicle keypoints from the plurality of vehicle keypoints based on a location of the one or more vehicle keypoints within an area as defined by the radius from a center of the bounding box.

Aspect 5. The method of Aspect 4, further comprising: discarding a portion of the plurality of vehicle keypoints that is outside the area as defined by the radius from the center of the bounding box.

Aspect 6. The method of any of Aspects 1 to 5, wherein the one or more vehicle keypoints each correspond to a plurality of Light Detection and Ranging (LiDAR) points from a LiDAR point cloud that is part of the sensor data, and wherein the one or more vehicle keypoints are distinct from corresponding corners of the bounding box.

Aspect 7. The method of any of Aspects 1 to 6, further comprising: determining a confidence score corresponding to the at least one bounding box extent; and adjusting a search area for identifying the one or more vehicle keypoints based on the confidence score.

Aspect 8. The method of any of Aspects 1 to 7, further comprising: determining that at least one vehicle keypoint corresponding to at least one corner of the at least one vehicle is not available; and providing an indication of the at least one vehicle keypoint that is not available to a prediction stack of the autonomous vehicle, wherein the prediction stack is configured to predict a path for the at least one vehicle.

Aspect 9. The method of any of Aspects 1 to 8, wherein associating the one or more vehicle keypoints with the bounding box further comprises: determining a distance between the bounding box and the plurality of vehicle keypoints.

Aspect 10. An apparatus comprising: at least one memory; and at least one processor coupled to the at least one memory, wherein the at least one processor is configured to perform operations in accordance with any one of Aspects 1 to 9.

Aspect 11. An apparatus comprising means for performing operations in accordance with any one of Aspects 1 to 9.

Aspect 12. A non-transitory computer-readable medium comprising instructions that, when executed by an apparatus, cause the apparatus to perform operations in accordance with any one of Aspects 1 to 9.

What is claimed is:

1. A system comprising:

a memory; and one or more processors coupled to the memory, the one or more processors being configured to:

receive, by a machine learning model configured to perform object detection, sensor data from one or more sensors of an autonomous vehicle;

identify, based on the sensor data, at least one vehicle that is located within an environment of the autonomous vehicle;

generate a bounding box corresponding to the at least one vehicle, wherein the bounding box includes one or more bounding box extents that are based on a type of the at least one vehicle;

determine a radius having a length that is based on the at least one bounding box extent; and identify, based on the sensor data, a plurality of vehicle keypoints, wherein each of the plurality of vehicle keypoints corresponds to a vehicle feature;

discard a portion of the plurality of vehicle keypoints that is outside the area as defined by the radius from the center of the bounding box;

associate, based on at least one bounding box extent of the one or more bounding box extents, one or more vehicle keypoints from the plurality of vehicle keypoints with the bounding box corresponding to the at least one vehicle and wherein associating the one or more vehicle keypoints from the plurality of vehicle keypoints is based on a location of the one or more vehicle keypoints within an area as defined by the radius from a center of the bounding box; and outputting the association from a keypoint association module to a prediction stack of the autonomous vehicle and predicting a future path of the at least one vehicle using the association;

outputting the predicted future path from the prediction stack to a planning stack of the autonomous vehicle and planning a maneuver of the autonomous vehicle based on the predicted future path of the vehicle; and implementing the planned maneuver using a control stack of the autonomous vehicle by controlling operations of at least one of a propulsion system, a braking system and a steering system of the autonomous vehicle.

2. The system of claim 1, wherein the vehicle feature includes at least one of a left front comer, a right front comer, a left rear comer, and a right rear comer.

3. The system of claim 1, wherein the bounding box is generated by a first detection head of the machine learning model and the plurality of vehicle keypoints are identified by a second detection head of the machine learning model.

4. The system of claim 1, wherein the one or more vehicle keypoints each correspond to a plurality of Light Detection and Ranging (LiDAR) points from a LiDAR point cloud that is part of the sensor data, and wherein the one or more vehicle keypoints are distinct from corresponding comers of the bounding box.

5. The system of claim 1, wherein the one or more processors are further configured to:

determine a confidence score corresponding to the at least one bounding box extent; and adjust a search area for identifying the one or more vehicle key points based on the confidence score.

6. The system of claim 1, wherein the one or more processors are further configured to:

determine that at least one vehicle keypoint corresponding to at least one corner of the at least one vehicle is not available; and provide an indication of the at least one vehicle keypoint that is not available to a prediction stack of the autonomous vehicle, wherein the prediction stack is configured to predict a path for the at least one vehicle.

7. The system of claim 1, wherein to associate the one or more vehicle keypoints with the bounding box the one or more processors are further configured to: determine a distance between the bounding box and the plurality of vehicle keypoints.

8. The system of claim 1, wherein the bounding box extents are based on a type of the vehicle.

9. The system of claim 1, wherein the plurality of keypoints are distinct from corners of the bounding box.

10. A method comprising:

receiving, by a machine learning model configured to perform object detection, sensor data from one or more sensors of an autonomous vehicle;

identifying, based on the sensor data, at least one vehicle that is located within an environment of the autonomous vehicle;

generating a bounding box corresponding to the at least one vehicle, wherein the bounding box includes one or more bounding box extents that are based on a type of the at least one vehicle;

determine a radius having a length that is based on the at least one bounding box extent; and identifying, based on the sensor data, a plurality of vehicle keypoints, wherein each of the plurality of vehicle keypoints corresponds to a vehicle feature;

discard a portion of the plurality of vehicle keypoints that is outside the area as defined by the radius from the center of the bounding box;

associating, based on at least one bounding box extent of the one or more bounding box extents, one or more vehicle keypoints from the plurality of vehicle keypoints with the bounding box corresponding to the at least one vehicle, and wherein identifying the one or more vehicle keypoints from the plurality of vehicle key points is based on a location of the one or more vehicle keypoints within an area as defined by the radius from a center of the bounding box;

outputting the association from a keypoint association module to a prediction stack of the autonomous vehicle and predicting a future path of the at least one vehicle using the association;

outputting the predicted future path from the prediction stack to a planning stack of the autonomous vehicle and planning a maneuver of the autonomous vehicle based on the predicted future path of the vehicle; and implementing the planned maneuver using a control stack of the autonomous vehicle by controlling operations of at least one of a propulsion system, a braking system and a steering system of the autonomous vehicle.

11. The method of claim 10, wherein the vehicle feature includes at least one of a left front comer, a right front comer, a left rear comer, and a right rear comer.

12. The method of claim 10, wherein the bounding box is generated by a first detection head of the machine learning model and the plurality of vehicle keypoints are identified by a second detection head of the machine learning model.

13. The method of claim 10, wherein the one or more vehicle keypoints each correspond to a plurality of Light Detection and Ranging (LiDAR) points from a LiDAR point cloud that is part of the sensor data, and wherein the one or more vehicle keypoints are distinct from corresponding comers of the bounding box.

14. The method of claim 10, further comprising:

determining that at least one vehicle keypoint corresponding to at least one corner of the at least one vehicle is not available; and providing an indication of the at least one vehicle keypoint that is not available to a prediction stack of the autonomous vehicle, wherein the prediction stack is configured to predict a path for the at least one vehicle.

15. The method of claim 10, wherein the bounding box extents are based on a type of the vehicle.

16. The method of claim 10, wherein the plurality of keypoints are distinct from corners of the bounding box.

17. A non-transitory computer-readable media comprising instructions stored thereon which, when executed are configured to cause a computer or processor to:

receive, by a machine learning model configured to perform object detection, sensor data from one or more sensors of an autonomous vehicle;

identify, based on the sensor data, at least one vehicle that is located within an environment of the autonomous vehicle;

generate a bounding box corresponding to the at least one vehicle, wherein the bounding box includes one or more bounding box extents that are based on a type of the at least one vehicle;

determine a radius having a length that is based on the at least one bounding box extent; and identify, based on the sensor data, a plurality of vehicle keypoints, wherein each of the plurality of vehicle keypoints corresponds to a vehicle feature;

discard a portion of the plurality of vehicle keypoints that is outside the area as defined by the radius from the center of the bounding box;

associate, based on at least one bounding box extent of the one or more bounding box extents, one or more vehicle keypoints from the plurality of vehicle keypoints with the bounding box corresponding to the at least one vehicle, and wherein identifying the one or more vehicle keypoints from the plurality of vehicle key points is based on a location of the one or more vehicle keypoints within an area as defined by the radius from a center of the bounding box;

outputting the association from a keypoint association module to a prediction stack of the autonomous vehicle and predicting a future path of the at least one vehicle using the association;

outputting the predicted future path from the prediction stack to a planning stack of the autonomous vehicle and planning a maneuver of the autonomous vehicle based on the predicted future path of the vehicle; and implementing the planned maneuver using a control stack of the autonomous vehicle by controlling operations of at least one of a propulsion system, a braking system and a steering system of the autonomous vehicle.

18. The non-transitory computer-readable media of claim 17, wherein the vehicle feature includes at least one of a left front comer, a right front comer, a left rear comer, and a right rear comer.

19. The non-transitory computer-readable media of claim 17, comprising further instructions configured to cause the computer or the processor to:

determine that at least one vehicle keypoint corresponding to at least one corner of the at least one vehicle is not available; and provide an indication of the at least one vehicle keypoint that is not available to a prediction stack of the autonomous vehicle, wherein the prediction stack is configured to predict a path for the at least one vehicle.

20. The non-transitory computer-readable media of claim 17, wherein the bounding box extents are based on a type of the vehicle.

* * * * *